(12) United States Patent
Knobloch et al.

(10) Patent No.: US 8,794,345 B2
(45) Date of Patent: Aug. 5, 2014

(54) STRIP-TILL NO BUILD-UP BERM BUILDER BLADE FOR STRIP-TILL FARM IMPLEMENT

(75) Inventors: Dean A. Knobloch, Goodfield, IL (US); Rodney L. Schmidt, Dewitt, IA (US)

(73) Assignee: CNH Industrial America LLC, New Holland, PA (US)

( * ) Notice: Subject to any disclaimer, the term of this patent is extended or adjusted under 35 U.S.C. 154(b) by 354 days.

(21) Appl. No.: 13/242,252

(22) Filed: Sep. 23, 2011

(65) Prior Publication Data

US 2013/0037285 A1  Feb. 14, 2013

Related U.S. Application Data

(60) Provisional application No. 61/522,582, filed on Aug. 11, 2011.

(51) Int. Cl.
*A01B 59/00* (2006.01)

(52) U.S. Cl.
USPC .......................................................... 172/604

(58) Field of Classification Search
USPC ......... 172/518, 540, 531–535, 555, 576, 604, 172/567, 556; 111/59, 60, 66, 69, 200
See application file for complete search history.

(56) References Cited

U.S. PATENT DOCUMENTS

| | | |
|---|---|---|
| RE9,169 E | 4/1880 | Johnson |
| 540,758 A | 6/1895 | Pelton |
| 1,186,880 A | 6/1916 | Canda |
| 1,879,193 A | 9/1932 | Graham |
| 2,596,574 A | 5/1952 | Lutes |
| 2,796,819 A * | 6/1957 | Johnson ........................ 172/540 |
| 3,557,879 A | 1/1971 | Van Der Lely |
| 4,047,576 A | 9/1977 | Rau et al. |
| 4,099,576 A | 7/1978 | Jilani |
| 4,280,566 A | 7/1981 | Breen |
| 6,082,276 A | 7/2000 | Klein et al. |
| 7,108,075 B2 * | 9/2006 | Powell et al. ....................... 172/1 |
| 2008/0066662 A1 | 3/2008 | Hesla |
| 2008/0099056 A1 | 5/2008 | Adhvaryu et al. |

FOREIGN PATENT DOCUMENTS

GB        2072471 A        10/1981

* cited by examiner

*Primary Examiner* — Robert Pezzuto
(74) *Attorney, Agent, or Firm* — Rebecca L. Henkel

(57) ABSTRACT

A berm building disc is designed to reduce the amount of soil that builds up on the inner surface of the disc as the disc pushes soil for berm formation. The disc has a disc body having an outer radial edge, and defining an inner concave surface and an outer convex surface. Features are formed on the inner concave surface to reduce the surface area or soil adhesion properties of the inner concave surface.

18 Claims, 10 Drawing Sheets

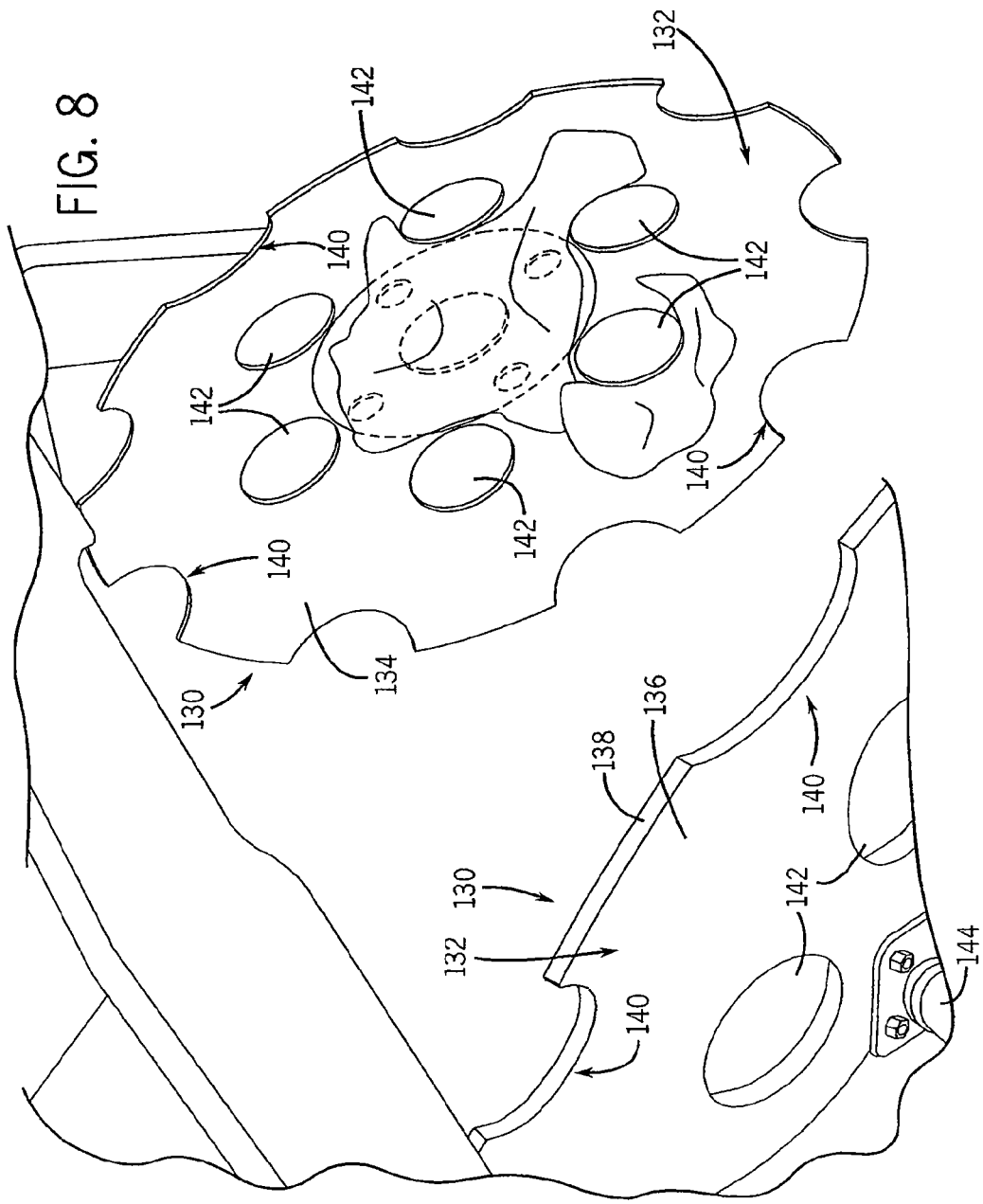

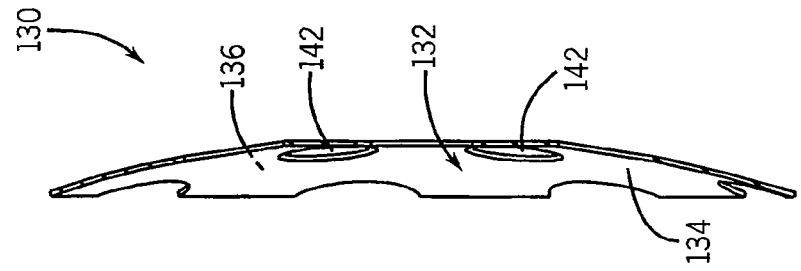
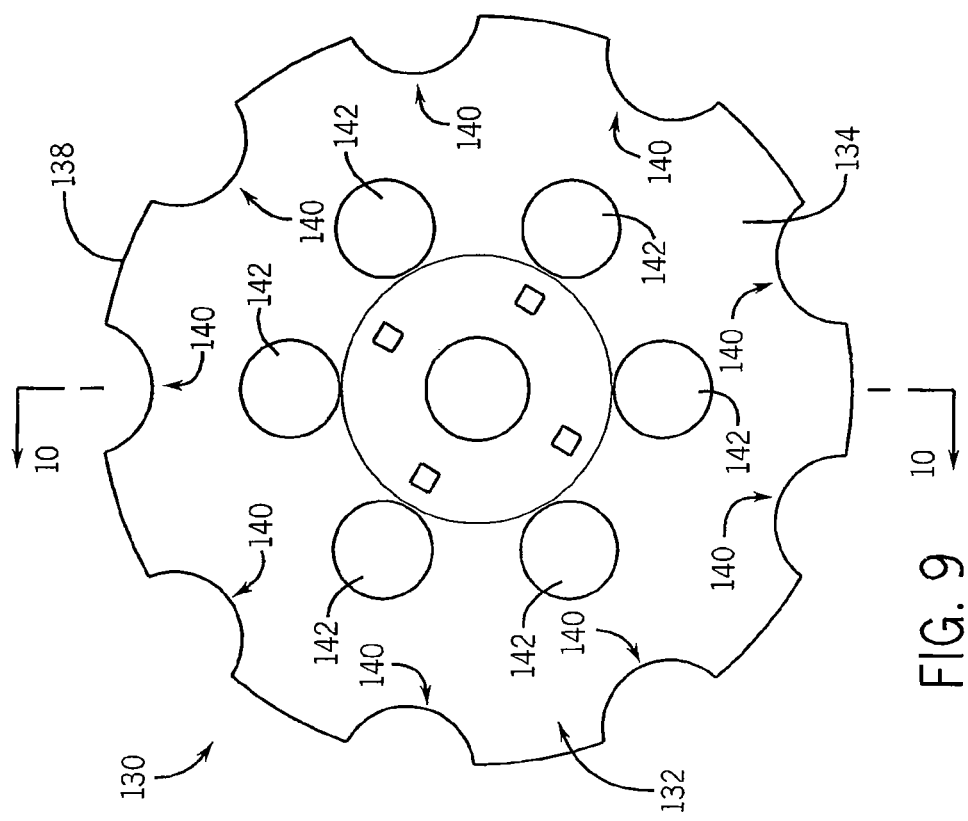
FIG. 10
FIG. 9

STRIP-TILL NO BUILD-UP BERM BUILDER BLADE FOR STRIP-TILL FARM IMPLEMENT

CROSS-REFERENCE TO RELATED APPLICATION

The present application claims the benefit of U.S. Ser. No. 61/522,582 filed Aug. 11, 2011.

BACKGROUND OF THE INVENTION

The present invention relates generally to farm implements and, more particularly, to tillage implements.

Tillage is an agricultural practice in which the soil ("seedbed") is prepared for subsequent seeding. The seedbed is prepared by agitating the soil using mechanical agitations, such as by digging, stirring, or overturning. Tillage loosens and aerates the top layer of soil. It also helps in the mixing of crop residue, organic matter, and nutrients throughout the soil. Tillage is also effective in uprooting and destroying invasive plantings, e.g., weeds, and also is effective in drying the soil before seeding.

Tillage is often classified into two types: primary and secondary. Primary tillage is typically carried out immediately or shortly after harvest to mix the crop residue with the soil. Primary tillage is also done at greater soil depths and leaves behind a rough and somewhat clumpy surface. Secondary tillage, on the other hand, is typically carried out immediately before seeding. It is carried out at shallower soil depths and yields a smoother surface finish. A couple of the principle aims of secondary tillage is to (1) reduce soil compaction that may have occurred over the winter and (2) dry out the soil.

While tillage can be classified into two different types, in general, there are three different types of tillage systems. Intensive tillage systems leave less than 15% crop residue cover or less than 500 pounds per acre (560 kg/ha) of small grain residue. These types of tillage systems are often referred to as conventional tillage systems. These systems involve often multiple operations with implements such as a mold board, disk, and/or chisel plow. Then a finisher with a harrow, rolling basket, and cutter can be used to prepare the seed bed. Reduced tillage systems leave between 15 and 30% residue cover on the soil or 500 to 1000 pounds per acre (560 to 1100 kg/ha) of small grain residue during the critical erosion period. This may involve the use of a chisel plow, field cultivators, or other implements. The third type of tillage systems are conservative tillage systems. Conservation tillage systems are methods of soil tillage which leave a minimum of 30% of crop residue on the soil surface or at least 1,000 lb/ac (1,100 kg/ha) of small grain residue on the surface during the critical soil erosion period. This slows water movement, which reduces the amount of soil erosion. Conservation tillage systems also provide the benefit of reduced fuel consumption and soil compaction.

One type of conservation tillage system is strip-till, which is intended to combine the soil drying and warming benefits of conventional tillage with the soil-protecting advantages of no-till by disturbing only the portion of the soil that is to contain the seed row. Another advantage of strip-till is that many of the strip-till machines can also apply chemicals and fertilizer at the same time as tillage.

A conventional strip-till machine or implement consists of a toolbar with a variety of working tools mounted thereto. These working tools typically include disc coulters, shanks, sealers ("berm builders"), and conditioning baskets. The disc coulters plough through and cut the crop reside and the shanks cut through the soil. This cutting through the soil causes the soil to be lifted whereupon the sealers, which are typically discs often arranged in tandem and angled relative to the direction of travel, push the raised soil toward an imaginary centerline between the two discs. The pushed soil effectively forms a berm. For those machines so-equipped, fertilizer or chemicals are placed in the soil as the shanks cut through the soil resulting in the berm containing a mixture of soil and chemicals and/or fertilizer. During planting, seeds will be deposited onto the nutrient-rich berms.

The sealers, as noted above, are typically discs (also referred to as "disc blades"). Each disc has an inner or concave surface and an outer or convex surface. For the tandem discs, the raised soil is pushed by the inner surfaces toward the aforementioned centerline to form a berm generally along the centerline. One of the drawbacks of conventional sealers is that soil tends to collect and build up on the inside or concave surface of the disc, as illustrated in FIG. 1. Soil tends to build up on the concave surface of the disc, starting from the center of the disc and continuing to build in an outwardly radial direction to the outer edge of the disc. The soil build-up is much more rapid with wetter/stickier soils or soil conditions. Wetter conditions are more prevalent in the late fall of the year with fall rains, reduced heat units to dry the soil, and reduced hours of sunlight. As much of the strip tillage takes place in the late fall, soil buildup on the sealers can be quite common.

When soil builds up on the concave side of the sealer disc, the disc becomes more like a roller than a blade and, as a result, the disc begins to ride over the lifted soil rather than direct the soil inward to build a berm. In strip-till, berm formation and berm height is critical and thus it is imperative that the berm builder disc be substantially free of build-up.

SUMMARY OF THE INVENTION

The present invention provides a disc for a sealer that is designed to reduce the amount of soil that builds up on the concave surface of the disc as the disc pushes the soil for berm formation. In this regard, the present invention provides for consistent operation of the disc as the reduced soil build-up on the disc does not substantially impede soil flow. Further, since the amount of soil build-up on the disc is reduced, less time is required to manually clean the disc. The present invention also provides a lighter disc and thus reduces the overall weight of the strip-till implement. A lighter implement reduces the stresses placed on the implement components and reduces the amount of horsepower required to pull/push the implement. Moreover, since the disc of the present invention significantly reduces soil accumulation on the concave surface, the weight from the soil that would otherwise accumulate is also reduced.

Therefore, in accordance with one aspect of the invention, a disc for use with a sealer assembly of a strip-till implement is provided. The disc has a body with an inner concave surface and an outer convex surface. The body is configured to rotate about an axis of rotation. A plurality of holes in radial spaced relation is also formed in the body. In one embodiment of the invention, the holes are centered about the axis of rotation. The holes reduce the surface area of the disc and thus reduce collection points for soil to build up on during use.

In accordance with another aspect of the invention, a disc for use with a sealer assembly of a strip-till implement is provided. The disc has a body with an inner concave surface and an outer convex surface. The body is configured to rotate about an axis of rotation. The inner concave surface has removed area(s) that reduce the overall surface area of the inner concave surface.

According to another aspect of the invention, a disc for use with a sealer assembly of a strip-till implement is provided. The disc has a body with an inner concave surface and an outer convex surface. An insert is attached to the inner concave surface and is formed of a material to which soil is less likely to adhere to compared to the material makeup of the inner concave surface.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 8 is an isometric view of a disc blade according to another embodiment of the present invention;

FIG. 9 is a left side elevation view of the disc blade of FIG. 8;

FIG. 10 is front elevation view of the disc blade of FIG. 9; and

DETAILED DESCRIPTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

Figure 4:
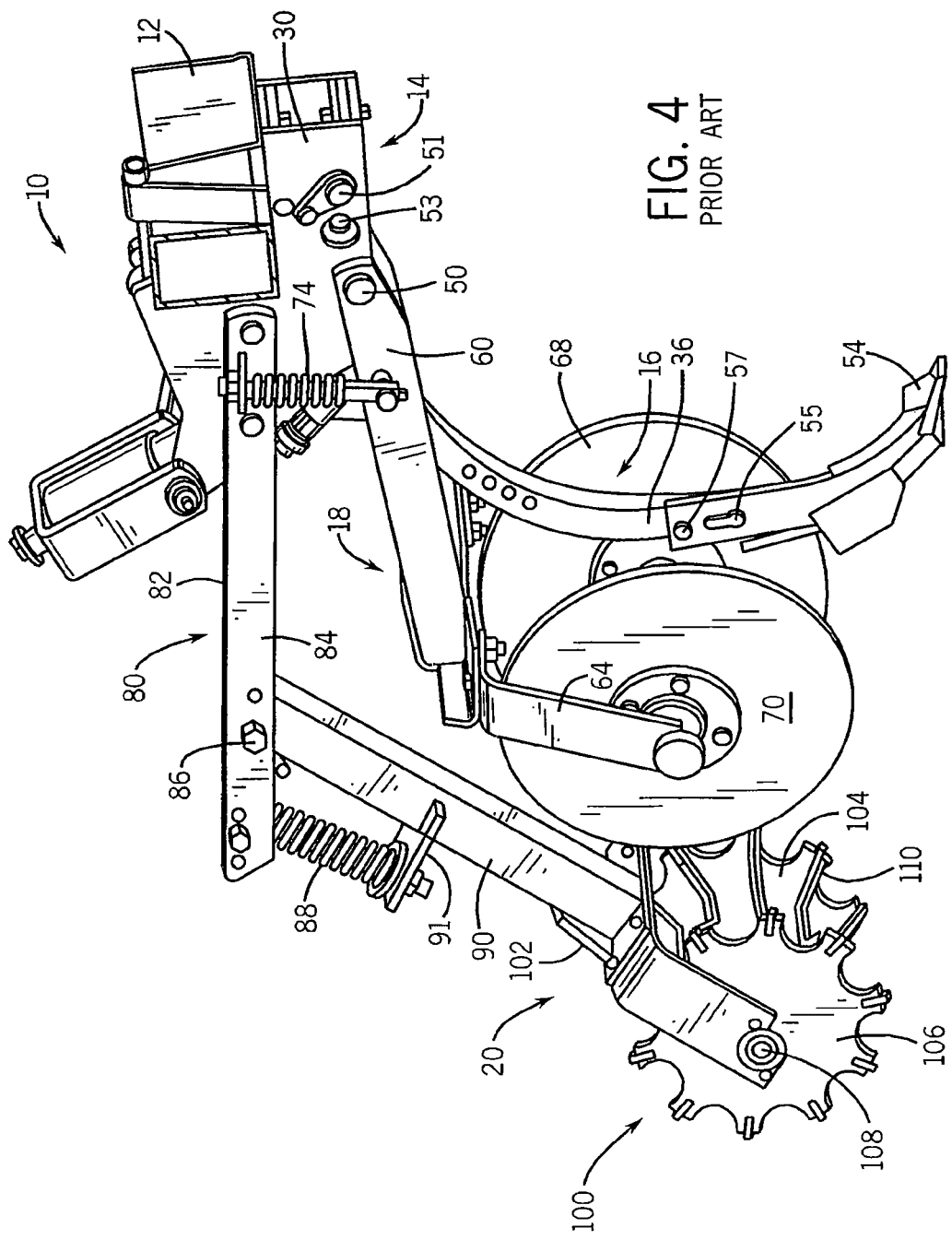
FIG. 4 is a partial right front perspective view of the working unit shown in FIGS. 2 and 3.

For purposes of discussion, the term "working unit" will be used herein to refer to a grouping of apparatus, for example as shown in FIG. 4, that engage the ground in concert to accomplish a certain tasks. In the case of the instant invention, the task accomplished is the creation of an improved strip-till seedbed in the form of a raised berm superiorly suited for planting.

Figure 2:
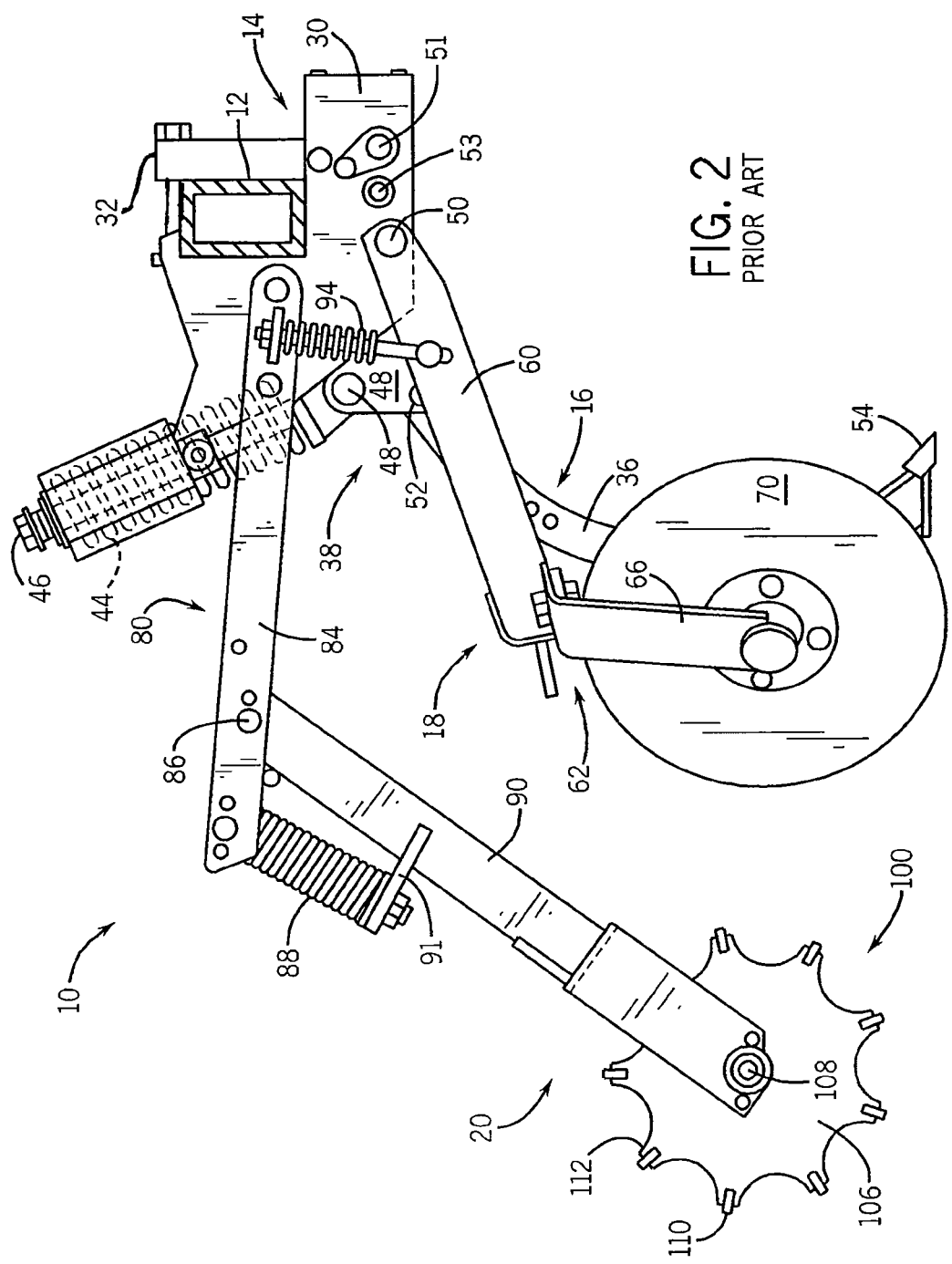
FIG. 2 is a side elevation view of a conventional working unit of a strip-till implement.

Referring now to FIG. 2, reference numeral 10 generally designates a conventional working unit for strip tillage. In this figure, the various ground-engaging apparatus are shown in a raised or transport position. For comparison, in the working position the tillage point would be in the ground several inches with the blade and conditioning reels assemblies generally at ground level. The working unit 10 is attached to an implement frame adapted to be drawn across the ground by a tractor, the forward direction to the right in FIG. 2. The implement frame conventionally includes a long, main tubular frame member, or toolbar, 12 that extends transversely to the direction of travel the desired width for the number of working units chosen. Toolbar 12 may comprise one or more sections that, in wider configurations, fold up into a more compact "package" for transport and storage. The location of the working units may be changed when it is desired to alter the spacing between adjacent working units, i.e., the working units may be relocated relative to one another along the toolbar. Typical implements have 6, 8, 12, 16 or more working units mounted to the toolbar at lateral spacings of 30-36 inches or as determined by planter row spacing. This side-by-side arrangement of multiple working units, each operating to create a seedbed row or a row of crops, is sometimes referred to as an "indexed" system.

The working unit 10, described with reference to FIGS. 2-4, comprises four basic components: (1) a toolbar mounting assembly 14, (2) shank assembly 16, (3) soil gather blade assembly 18, and (4) conditioning rotary reel assembly 20.

Toolbar mounting assembly 14 is comprised of a heavy-gauge steel irregularly shaped coupler 30 with a transverse adjustable opening, or track, 32 therethrough that is fitted to the toolbar 12. The coupler 30 is sufficiently rigid and affixed to the toolbar such that the remainder of the basic components form a working unit supported by the toolbar.

Shank assembly 16 is comprised of shank 36, a shank bracket 38 including a pair of side plates 40, 42 affixed to coupler 30 of the toolbar mounting assembly 14, a compression spring 44 affixed at the top end to coupler 30 at 46 and to shank bracket 38 at the bottom end by bolt 48. The shank bracket 38 is pivotably affixed to toolbar coupler 30 by pin 51 such that the shank 36 may pivot a distance limited by the amount that spring 44 can be compressed. Shank 36 is affixed to shank bracket 38 by bolts 52 and 53. Shank 36 is formed of heavy plate stock having a thickness of about 1¼ inches, although this dimension is not critical to the instant invention.

The shank 36 is characterized herein as being generally curved; however, other configurations could prove satisfactory. In any event, shank 36 is shown to extend forwardly at the base where there is located a ground-breaking tillage point 54. The tillage point 54 is commonly referred to as a fertilizer knife to accommodate anhydrous ammonia and or other product nutrients. Tillage point 54 is normally run in the range of about 5 to 9 inches deep. The point runs in the compaction layer, fractures the layer and relocates the soil particles. Shank 36 is adjustable vertically by raising and lowering the toolbar in known manner. To protect the shank 36 and other components of the implement 10 from severe damage, tillage point 54 is provided with a shear bolt 55 that fails upon being subjected to a predetermined force created by impact between the point 54 and a relatively immovable object such as a rock, tree root or the like. Failure of shear bolt 55 allows point 54 to pivot rearwardly about bolt 57.

A gathering blade bracket 60 is rigidly fixed at the lower end to blade yoke 62 and at the upper end to coupler 30 by the pivot bolt 50. Yoke 62 has two downwardly extending yoke arms 64, 66 rotatably attached, respectively to blades 68 and 70. These blades may be of any suitable type; however, concave disc blades are preferred. The blades are angled inwardly, front to back, to gather the soil exploded by the shank 36 and redirect it inwardly toward the conditioning rotary reel. A pair of adjustable compression springs 72, 74, one on each side of coupler 30, is affixed at the top end to support arm 80 of the conditioning rotary reel assembly 20 and at the lower end to gathering blade bracket 60. Thus, the blades are biased downwardly. The length of the gathering disc bracket 60 is such that the blades 68, 70 are positioned substantially adjacent and slightly rearwardly to the shank 36 and the groundbreaking point 54. By positioning the pivot point 50 of the gathering blade assembly 18 forward of the shank 36 the gathering blades are caused to move mostly upwardly when the depth of tillage point 54 changes (as it constantly does when crossing a field), thus maintaining the positional relationship between the gathering discs and the shank. More specifically, as tillage point 54 breaks through the ground, it creates a flow of soil from each side of shank 36, much like snow flowing off of a V-shaped snowplow. The gathering blades 68, 70 are positioned adjacent and slightly rearwardly of the shank such that they engage this flow of soil and redirect it toward the path of the shank for treatment by the conditioning reel. The pivot point of the gathering blade assembly maintains the positional relationship between the blades and the shank no matter how the depth of the tillage point varies. This positioning prevents soil exploded by the shank point from projecting outside of the blades, and ensures that there is sufficient soil to build a proper berm. The blades are adjustable for depth, angle, and distance between blades to permit the operator to maximize the containment of soil to build a berm. The blades may be dull-edge or sharp-edge, depending upon how much soil is to be moved. Dull blades tend to ride on top, while sharp blades tend to cut in.

Conditioning rotary reel assembly 20 is comprised of support arm 80 rigidly affixed at the forward end to coupler 30 and extending rearwardly therefrom in a cantilevered configuration. Support arm 80 is shown as two identical flat bars 82, 84 bolted to either side of coupler 30 and pivotally connected to reel arm 90 at pivot bolt 86. An adjustable compression spring 88 extends between support arm 80 and a stop plate 91 rigidly affixed to reel arm 90 such that the reel arm 90 may pivot about pivot bolt 86 to adjustably absorb movement of the rotary reel due to uneven areas of the ground or impacts with obstacles on the field. Most importantly, however, compression spring 88 adjusts the down pressure for controlling clod sizing.

A coulter (not shown) is affixed forwardly of the shank 36 to either toolbar 12 or another toolbar or structural member of the implement frame in know fashion. Numerous examples exist in the prior art, but examples of such a coulter are shown in U.S. Pat. Nos. 5,797,460 and 6,102,132 and would prove satisfactory in the instant application. A coulter thus located results in cutting and sizing residue. The depth of cut of the coulter would be adjustable upwardly or downwardly within a clamp, and adjusted to accommodate or compensate for various settings of the tillage depth or soil conditions. General practice would be to use a coulter with a diameter of approximately 20 to 24-inches. The coulters may be either wavy or smooth depending upon desired results and working conditions; smooth being preferred. For in-row root cutting and less surface disruption, a smooth coulter would be selected. In any event, the primary purpose of the coulter is to cut the residue and cut a groove into the soil to enhance soil flow at the tillage point and equalize soil flow off of each side of the tillage point.

A conditioning rotary reel 100 conditions the strip of soil to shape and pre-settle the berm, to give ideal seed-to-soil contact and uniform berm size, thus promoting early, fast and uniform emergence. The rotary reel 100 is mounted to a yoke 102 on bearings to provide smooth and free relative rotation of the reel. The yoke 102 is affixed to reel arm 90 pivotally mounted to support arm 80. The reel assembly 20 is shown to include an adjustable spring 88, which would be adjusted as needed to maintain firm engagement between the conditioning rotary reel and the ground sufficient to break up clods. Generally, the larger the clods in the field, the greater the down pressure required. If down-pressure is required to augment the weight of the reel itself, any appropriate mechanism or approach can be used, such as, for example, spring packs or weights.

As the shank cuts through the soil, it explodes the soil outwardly where it contacts the gathering blades and is redirected inwardly toward the path of the shank. If the surface of the ground is level and the density is generally uniform, the soil exploded is uniform on the two sides of the shank, and is uniform when turned inwardly by the blades; however, as is more often the case, the ground is not level and the soil is not of uniform density, the exploded soil is not of equal volume on the two sides of the shank and, thus, the soil turned by the blades is not uniform and of equal volume. This lack of uniformity of volume and density causes the blade being hit by the higher volume to throw more soil inwardly, and to actually throw some soil all the way across the shank path and onto an untilled area of the ground. This situation presents a problem in that it does not provide sufficient volume of soil to build the desired berm. To avoid this, the conditioning rotary reel must be located close enough to the blades to catch the extra volume of soil and encompass it into the berm. Generally, this requires the conditioning rotary reel to be located in the range of 6 to 10 inches from the back of the blades.

Figure 3:
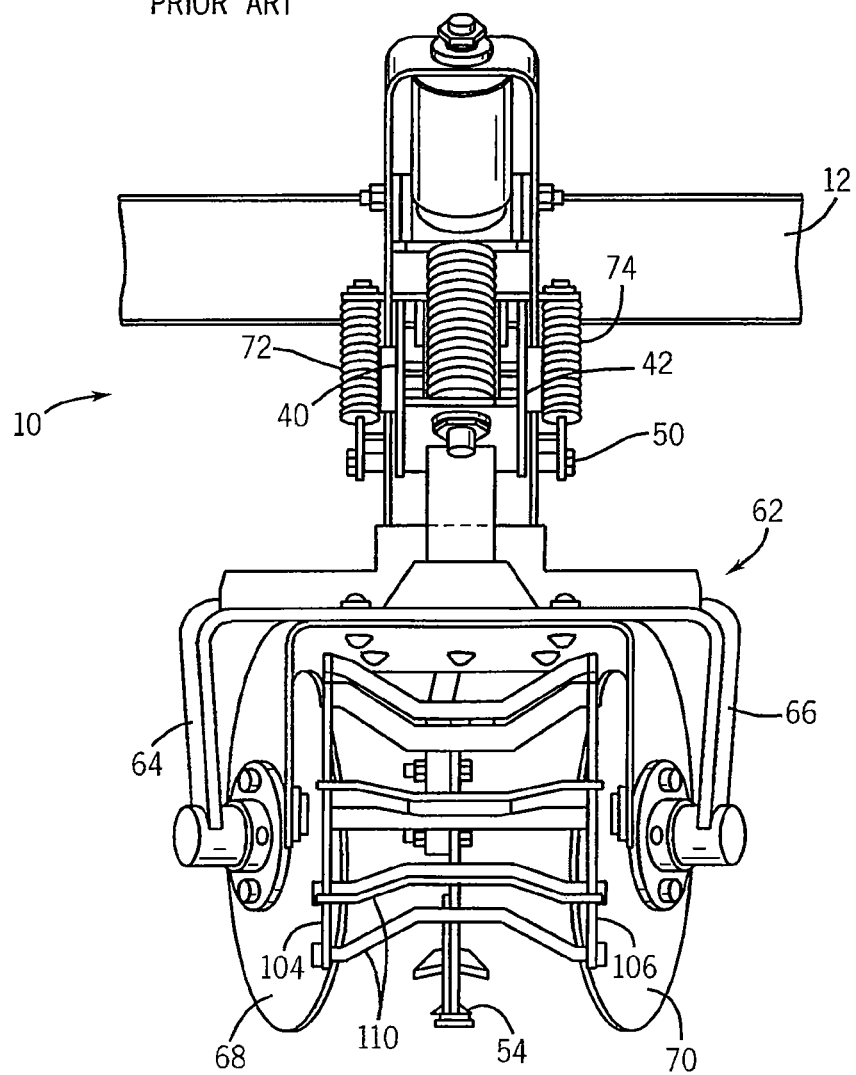
FIG. 3 is a rear elevation view of the working unit shown in FIG. 2.

Still referring to FIGS. 2-4, rotary reel 100 can be seen to include a pair of opposing end plates 104, 106. The end plates may be notched or scallop-shaped to reduce plugging in wet conditions and avoid creation of a groove beside the berm. The end plates are partially maintained in transverse alignment by a support shaft 108 that extends through centrally located apertures in each of the end plates. Support shaft 108 is affixed, as by welding, to each of the end plates and extends beyond each to fit into bearings on yoke 102. A plurality of elongate ground-engaging bars 110, made from flat stock, extends from end-to-end across the end plates and are affixed thereto. The end plates have slots, as at 112 in FIG. 2, into which the bars fit. After welding, this arrangement provides superior support and strength for the connection. While it is preferred that the bars be fabricated from flat stock, satisfactory results can be obtained by the use of other structures, such as, for example, bar stock or lengths of tubular material. It should be obvious to one of ordinary skill in the art that other methods and arrangements for affixing the bars to the end plates would provide a satisfactory structure.

Figure 1:
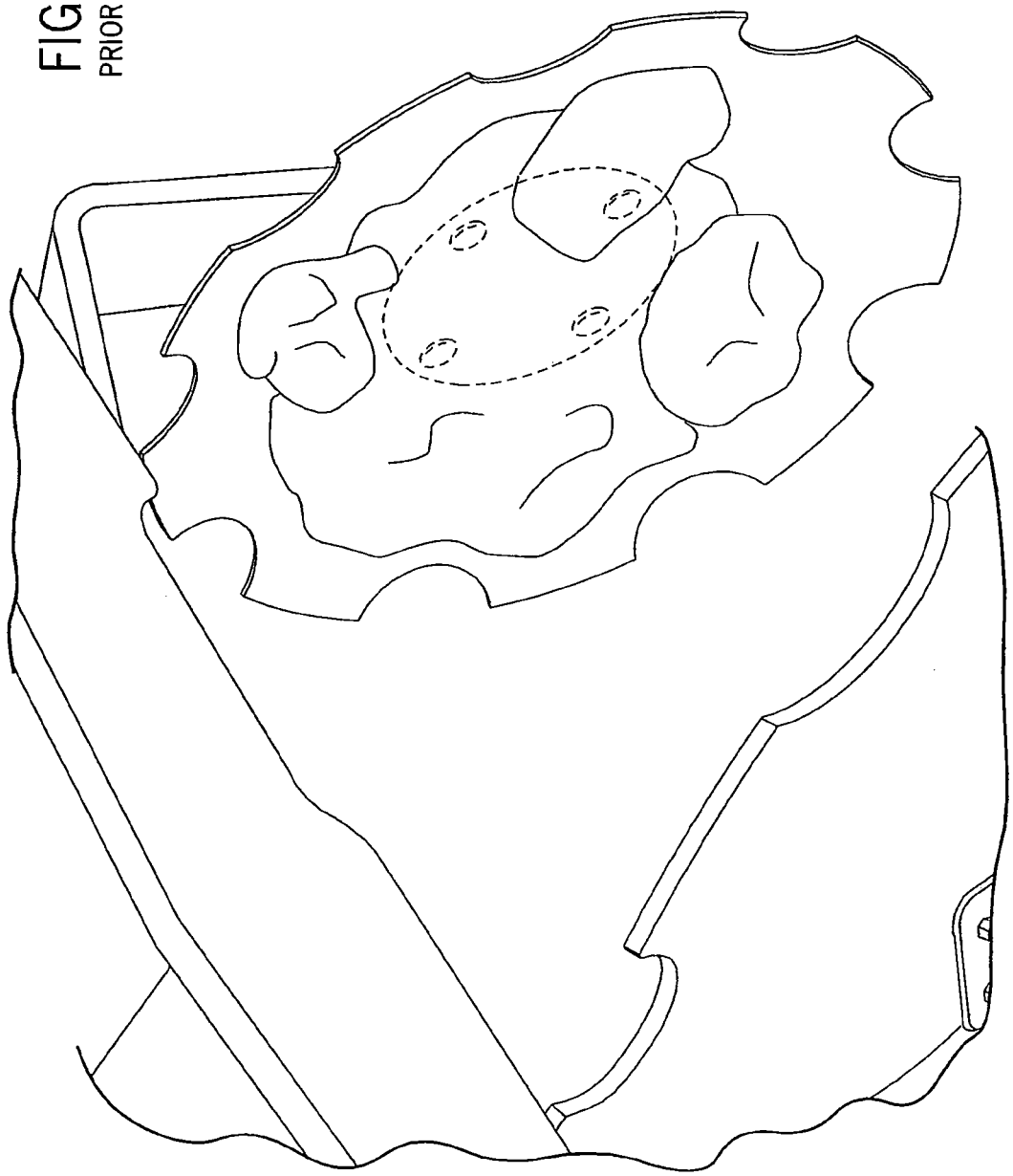
FIG. 1 is an isometric view of a conventional disc blade shown with soil build-up.
Figure 5:
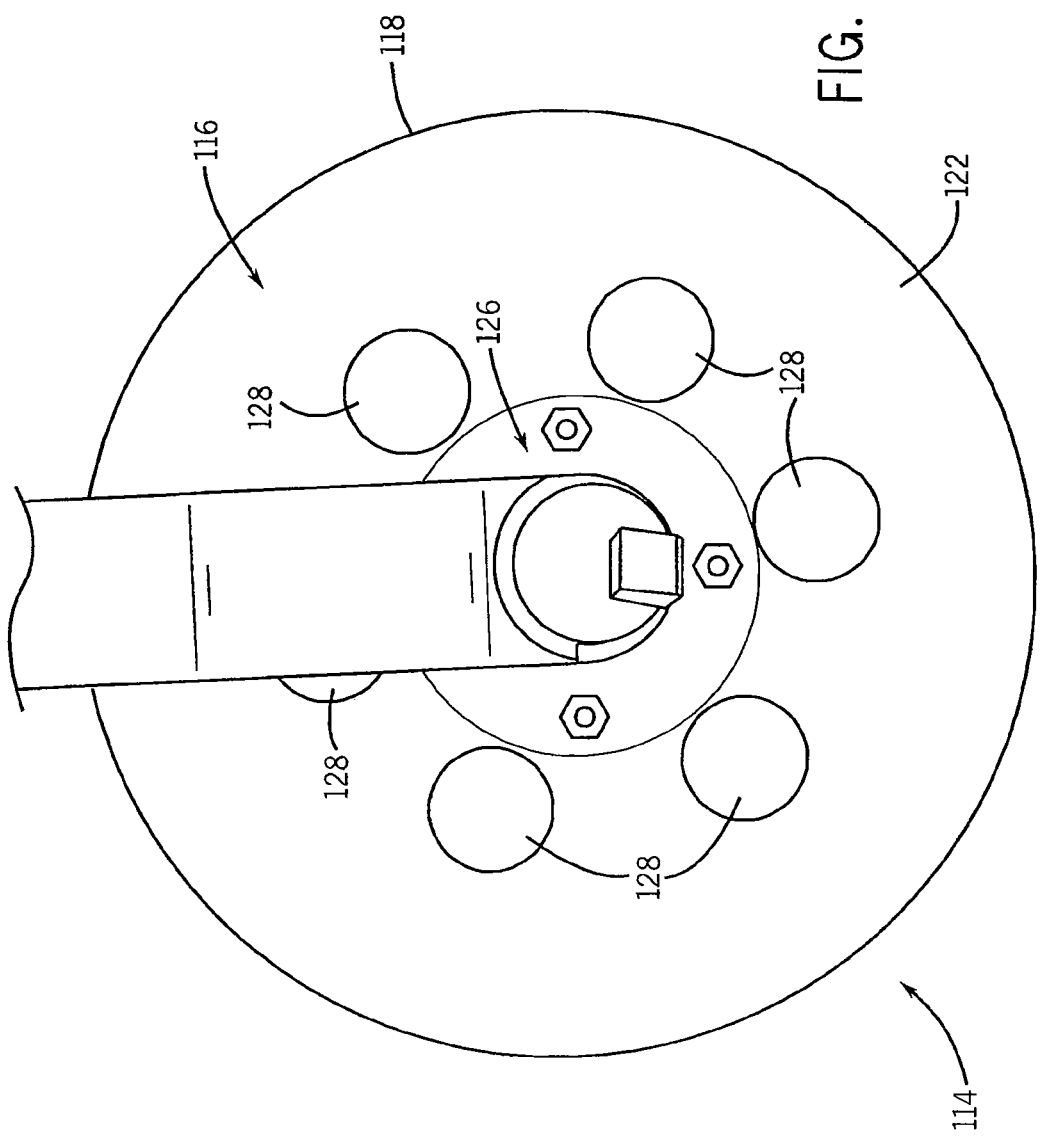
FIG. 5 is a right side elevation view of a disc blade according to one embodiment of the present invention for use with the working unit of FIGS. 2-4.
Figure 6:
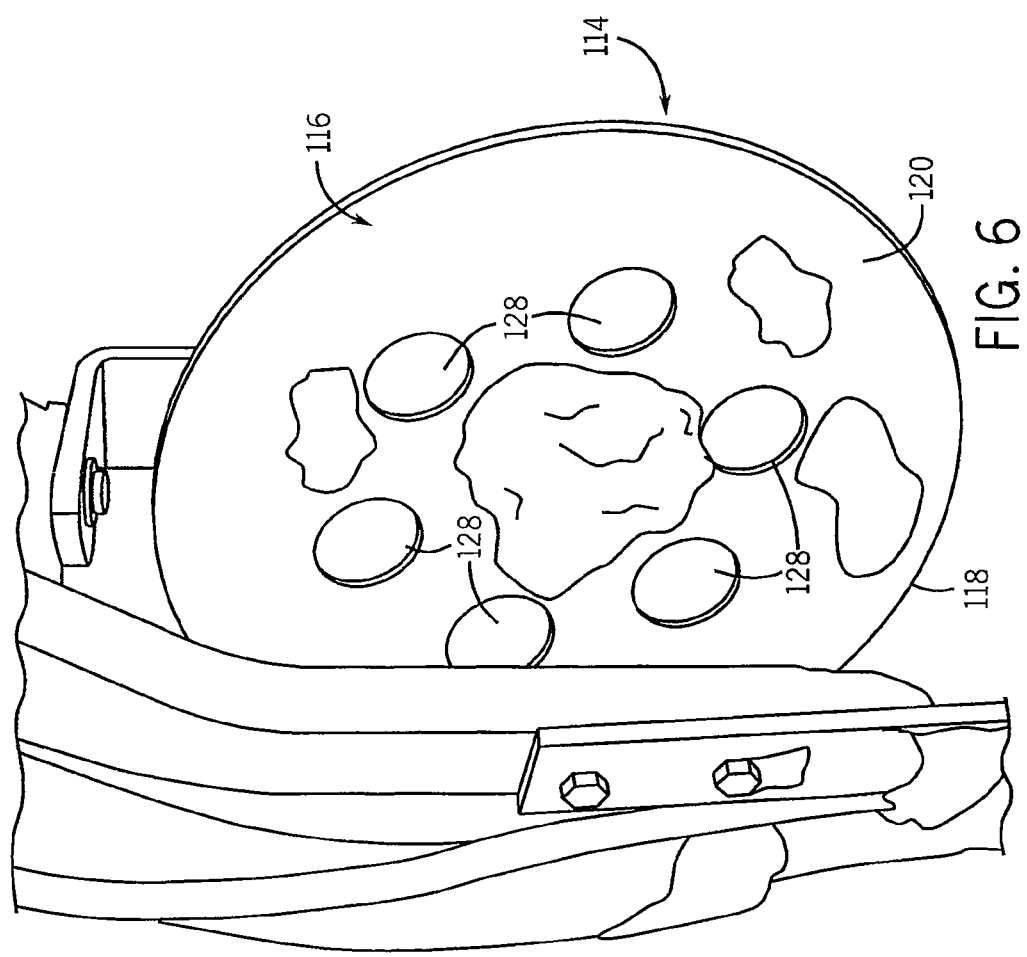
FIG. 6 is a left isometric view of the disc blade of FIG. 5.
Figure 7:
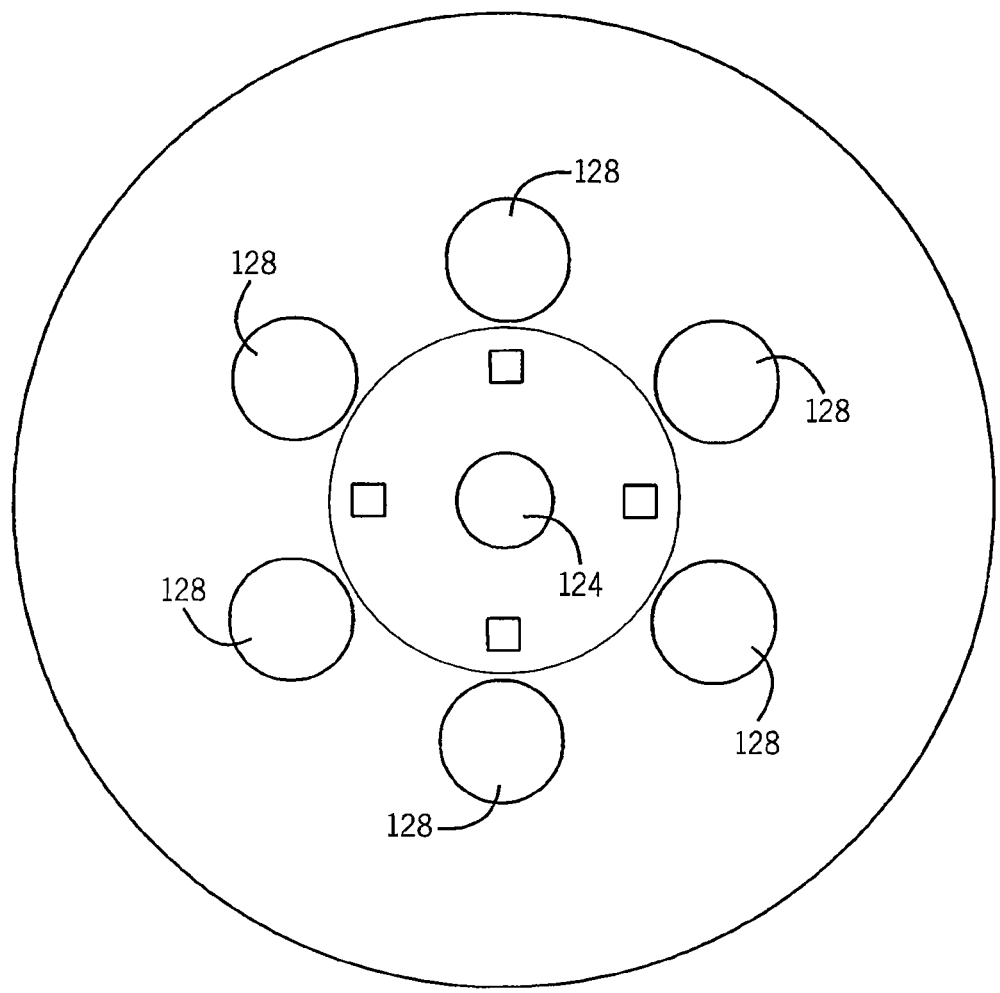
FIG. 7 is a plan view of the disc blade shown in FIGS. 5 and 6.

FIGS. 2-4, as described above, show a working tool having conventional berm forming blades, which are designated in the figures by reference numerals 68 and 70. As shown in those figures, each blade 68, 70 has a solid inner concave surface, which as discussed above, can result in soil capture and build-up on the concave surface, such as that shown in FIG. 1. Accordingly, the present invention provides a concave blade 114 having a relatively thin body 116 with an outer radial edge 118, and defining an inner concave surface 120 and an outer convex surface 122, as shown in FIGS. 5-7. As best shown in FIG. 7, a central opening 124 is formed in the center of the body 116 and is used for mounting the concave blade 114 to an axle assembly 126, which is shown in FIG. 5 and generally known in the art.

In a preferred embodiment, portions of the body 116 are removed to reduce the surface area of the inner concave surface 120. In the illustrated embodiment, this reduction in surface area is achieved by cutting or otherwise forming holes 128 in a spaced radial arrangement around the central opening 124. The holes 128 are preferably located as near to the center, i.e., central opening 124, of the blade body as possible without interfering with the mounting of the blade to the yoke arm. By reducing the surface area at the center of the inner concave surface 120, there is a reduced amount of blade material for soil to adhere to during tillage. By keeping the center area of the inner concave surface 120 substantially free of soil build-up (or at least significantly reducing the amount of soil build-up), soil build-up is also reduced at the outer radial portion of the blade, which prevents the blade from operating like a roller instead of a blade.

In one embodiment, the radial distance from the center of the central opening 124 to the center of each hole 128 is approximately 4.5 inches and the diameter of each hole 128 is approximately 2.375 inches. In one embodiment, six holes 128 are formed equiradially around the central opening 124, i.e., at 60 degree intervals from the origin of the central opening; however, other arrangements are contemplated.

FIGS. 8-10 show a berm forming concave blade 130 according to another embodiment of the invention. Like the embodiment described above with respect to FIGS. 5-7, concave blade 130 has a relative thin body 132 having an inner concave surface 134 and an outer convex surface 136. Rather than a continuous curved outer edge, concave blade 130 has a scalloped outer radial edge 138 in which a series of notches 140 or "scallops" are cut, or otherwise formed, in the radial edge 138. Concave blade 130 also has a series of surface area-reducing holes 142 centered about a mounting opening (not shown) and mounting axle 144. In the illustrated embodiment, the outer radial edge 138 has eight notches 140.

The heretofore described holes reduce the surface area of the inner concave surface and thus reduce collection points for soil. This reduces the amount of soil that would otherwise collect on the inner concave surface of the blades, which is apparent from comparing FIG. 1 with FIGS. 6 and 8. It is understood that the surface area-reducing holes described above represent but one manner in which the surface area of the inner concave surfaces could be reduced. For example, slits/slots could be cut into the blade. Additionally, while circular holes are shown and have been described, it is understood that the surface-area reducing features could have other geometric or complex shapes. Additionally, it is contemplated that a single disc could have more than one type or one shape of surface-area reducing feature. Moreover, it is contemplated that the surface-area reducing features could be of varying sizes.

Figure 11:
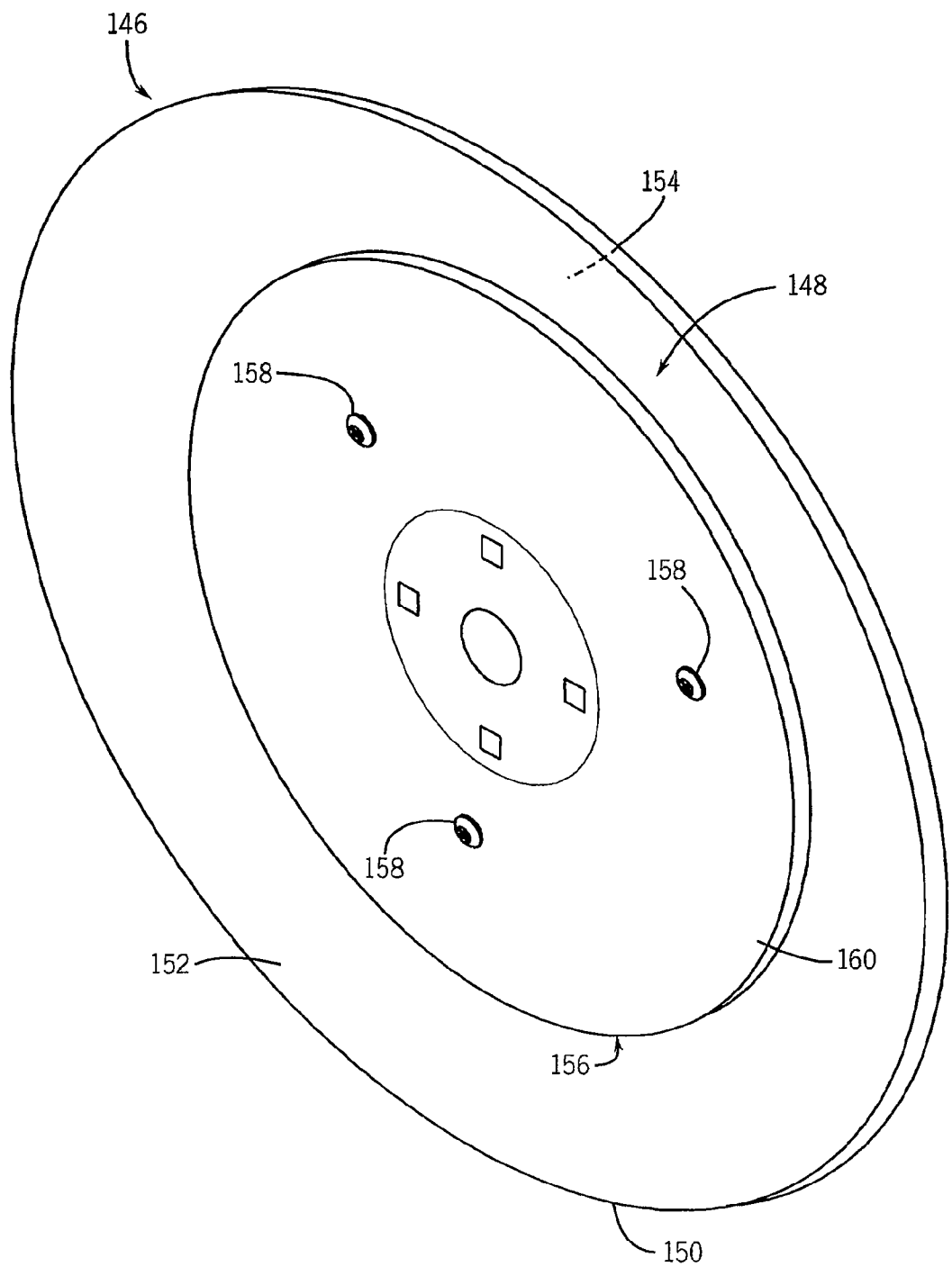
FIG. 11 is an isometric view of a disc blade according to a further embodiment of the present invention.

Turning now to FIG. 11, a disc blade 146 according to another embodiment of the invention has a circular body 148 with an outer radial edge 150. The circular body 148 has an inner concave surface 152 and an outer convex surface 154. To reduce soil collection on the inner concave surface 152, an insert 156 is attached to the inner concave surface 152. In one embodiment, fasteners 158, e.g., screws, are used to secure the insert 156 to the circular body 148. Alternately, suitable bonding agents could be used. The insert is mounted at the center of the inner concave surface 152, and has a generally circular body 160 formed of plastic, polyurethane, or other corrosion resistant material. It is highly preferred that the outer surface of the insert 156 is formed of a material having low soil adhesion properties. Having the outer surface of the insert "slicker" than the inner concave surface resists soil buildup on the insert and thus the inner concave surface. The insert is preferably made of lightweight material so that the weight of the blade is not substantially increased.

The present invention has been described with respect to a disc for use with a strip-tillage implement but it is understood that the invention could be used with other types of farming implements, such as disc sealers, disk rippers, and levelers to name a few. Additionally, while the invention has been described with respect to a concave disc, it is understood that the invention is not so limited. For example, the invention could also be used with flat discs.

Many changes and modifications could be made to the invention without departing from the spirit thereof. The scope of these changes will become apparent from the appended claims.

The invention claimed is:

1. A disc blade for a farming implement, comprising:
a concave body having a generally smooth inner surface, an outer surface, a radial outer edge, and a central opening formed therein, the central opening being adapted for receiving a mount for coupling the disc blade to a strip-till implement; and
a plurality of holes extending through the body between the inner surface and the outer surface at a location radially spaced from the radial outer edge of the body and in proximity to the central opening.

2. The disc blade of claim 1 wherein the plurality of holes are arranged in a radial spaced arrangement around the central opening.

3. The disc blade of claim 2 wherein the plurality of holes includes six holes spaced on nine inch centers around the central opening.

4. The disc blade of claim 1 wherein each of the plurality of holes has a diameter between 2.0-2.5 inches.

5. The disc blade of claim 1 further comprising a plurality of notches formed in the radial outer edge.

6. The disc blade of claim 1 wherein the inner surface has an inner radial portion and an outer radial portion, and wherein the plurality of holes is formed in the inner radial portion.

7. The disc blade of claim 1 wherein the inner surface is a concave surface and the outer surface is a convex surface.

8. A disc blade for a farming implement, comprising:
a body having a generally smooth inner surface, an outer surface, a radial outer edge and a central opening formed therein; and
means for reducing a surface area of the inner surface, the means for reducing the surface area including a plurality of holes extending through the body between the inner surface and the outer surface thereof at a location radially spaced from the radial outer edge of the body and in proximity to the central opening.

9. The disc blade of claim 8 wherein the plurality of holes are arranged in a radial spaced arrangement around the central opening.

10. The disc blade of claim 9 wherein the plurality of holes includes six holes spaced on nine inch centers around the central opening.

11. The disc blade of claim 8 wherein each of the plurality of holes has a diameter between 2.0-2.5 inches.

12. The disc blade of claim 8 wherein the inner surface is a concave surface and has an inner radial portion and an outer radial portion, and wherein the plurality of holes is formed in the inner radial portion.

13. The disc blade of claim 8 further comprising a plurality of notches formed in the radial outer edge.

14. The disc blade of claim 8 wherein the body has a thickness between one-tenth of an inch and four-tenths of an inch.

15. A working unit for a farming implement having a tool bar, comprising:
a coupler for mounting to the tool bar;
a bracket attached to the coupler; and a disc rotatably attached to the bracket, the disc including a body having a generally smooth inner surface, an outer surface, a radial outer edge, a central mounting portion, and a plurality of holes extending through the body between the inner surface and the outer surface, the plurality of holes extending through the body at a location radially spaced from the radial outer edge of the body and in proximity to the central mounting portion.

16. The working unit of claim 15 wherein the central mounting portion of the body includes a central opening formed in the body and adapted for receiving a mount for coupling the disc blade to the bracket, and wherein the plurality of holes are arranged in a radial spaced arrangement around the central opening.

17. The working unit of claim 16 wherein the plurality of holes includes six holes spaced on nine inch centers around the central opening.

18. The working unit of claim 15 wherein the inner surface is concave and the outer surface is convex.

\* \* \* \* \*